(12) United States Patent
Palumbo, II

(10) Patent No.: US 6,286,219 B1
(45) Date of Patent: Sep. 11, 2001

(54) LASER ALIGNMENT METHOD AND APPARATUS

(76) Inventor: Charles E. Palumbo, II, 365 E. Church Rd., Elkins Park, PA (US) 19027

( * ) Notice: Subject to any disclaimer, the term of this patent is extended or adjusted under 35 U.S.C. 154(b) by 0 days.

(21) Appl. No.: 09/326,424

(22) Filed: Jun. 4, 1999

(51) Int. Cl.$^7$ .................................................. G01C 15/00
(52) U.S. Cl. ................ 33/286; 33/227; 33/333; 33/529; 33/533; 33/645; 33/DIG. 21; 372/109; 356/399; 362/259
(58) Field of Search .................. 33/227, 228, 286, 33/333, 347, 529, 533, 645, DIG. 21; 372/109, 705; 356/399; 362/259

(56) References Cited

U.S. PATENT DOCUMENTS

| | | | |
|---|---|---|---|
| 4,915,470 | * | 4/1990 | Moore et al. ........................ 350/96.2 |
| 4,947,556 | * | 8/1990 | Peil ........................................ 33/370 |
| 5,359,781 | * | 11/1994 | Melville ................................. 33/286 |
| 5,426,507 | * | 6/1995 | Rando ................................... 356/399 |
| 5,461,793 | * | 10/1995 | Melville ................................. 33/286 |
| 5,568,265 | * | 10/1996 | Matthews .............................. 33/286 |
| 5,576,826 | * | 11/1996 | Hamar .................................. 356/138 |
| 5,604,987 | * | 2/1997 | Cupp ..................................... 33/290 |
| 5,653,036 | * | 8/1997 | Dansereau ............................. 33/529 |
| 5,784,792 | * | 7/1998 | Smith .................................... 33/227 |
| 6,052,911 | * | 4/2000 | Davis .................................... 33/286 |
| 6,124,935 | * | 9/2000 | Matthews ............................. 356/399 |

OTHER PUBLICATIONS

Edmund Scientific Co. Catalog, pp. 208–209, 1999.*

* cited by examiner

Primary Examiner—Randy W. Gibson

(57) ABSTRACT

Laser alignment methods and apparatus are disclosed whereby pipe and similar materials may be aligned. The methods and apparatus are adapted to be utilized on the end of pipe or other material and thereby using as a reference point that pipe or other material with the reference beam generated by the laser providing a center reference point from the pipe on which the laser is mounted. In a preferred embodiment, the laser apparatus mounting is threaded so as to be used in mating relationship with the ends of complimentarily threaded pipes. Another preferred embodiment utilizes caps of various sizes, adapted to be placed on a pipe end, with mounting means for the laser.

2 Claims, 4 Drawing Sheets

LASER ALIGNMENT METHOD AND APPARATUS

BACKGROUND OF THE INVENTION

This invention relates to apparatus and methods used regarding alignment of pipe and other materials. More particularly, it relates to laser apparatus and methods used in the alignment of pipe and other materials.

The use of lasers in the alignment of pipe and other materials is of course known in the art. One method is to use a reference beam of light generated by a laser in combination with a reference marker or target in order to provide a straight line along which to establish the desired paths of the pipe. This ensures alignment along the laser beam or at the target's reference point remote from the laser because of the straight line accuracy of the laser beam. The use of the target, however, is in many cases less than convenient, especially where only a single worker is operating the system, as may be the case when laying sprinkler pipe or other pipe in indoor construction. Moreover, the laser used in this method is a gas laser. Gas lasers are themselves unwieldy, requiring high levels of power, which makes use difficult in handheld operations.

What has been lacking to date are simple and inexpensive apparatus and methods for the alignment of pipe and other material. This lack is especially acute in pipe alignment in internal construction, for example, such as in sprinkler pipe systems for warehouses. These pipe systems, usually comprised of branch lines running outwardly from a main or mains, are often laid in a grid pattern or at right angles.

The powerful beam of a gas laser is misplaced in such construction, and the need for reference targets in methods known in the art makes those methods unwieldy and cumbersome. Therefore, and typically in such a job, sprinkler pipe grids are laid using a method of hand measurement from a fixed reference point or points. This method rapidly becomes tedious, because it requires constant measurements as the pipe is laid in a grid arrangement over the entire ceiling area. It is also slow and inefficient, because of the need for constant measurement and remeasurement—the job progresses slowly and inefficiently.

A similar situation is seen in modular construction. In modular construction, there is often a need to go through multiple walls with a single pipe run. For example, a strip mall may require pipe, such as sewer pipe, to be laid through the fire walls separating each store. The pipe run is determined by measuring to a point on each fire wall as it is successively penetrated. This again is tedious work, requiring frequent stops and starts as each section of pipe is laid, with attendant inefficiency and increased costs.

Accordingly, it is an object of the present invention to provide simple and easy to use laser apparatus and methods for the alignment of pipe and other materials.

It is a further object of the present invention to provide lightweight and low power laser apparatus and methods for the alignment of pipe and other materials.

SUMMARY OF THE INVENTION

The present invention comprises laser alignment apparatus and methods, adapted to be utilized on the end of pipe or other material and thereby using as a reference point that pipe or other material. In a preferred embodiment, the laser apparatus mounting is threaded so as to be used in mating relationship with the ends of complimentarily threaded pipes. Another preferred embodiment utilizes caps of various sizes, adapted to be placed on a pipe end, with mounting means for the laser.

The laser in these and other embodiments generally use the pipe or other materials as the reference point for the reference beam emitted by the laser. The preferred embodiments have the laser mounting apparatus centered on the pipe end, so that the reference beam generated by the laser provides a center reference point from the pipe on which the laser is mounted.

DETAILED DESCRIPTION OF THE PREFERRED EMBODIMENTS

Figure 1:
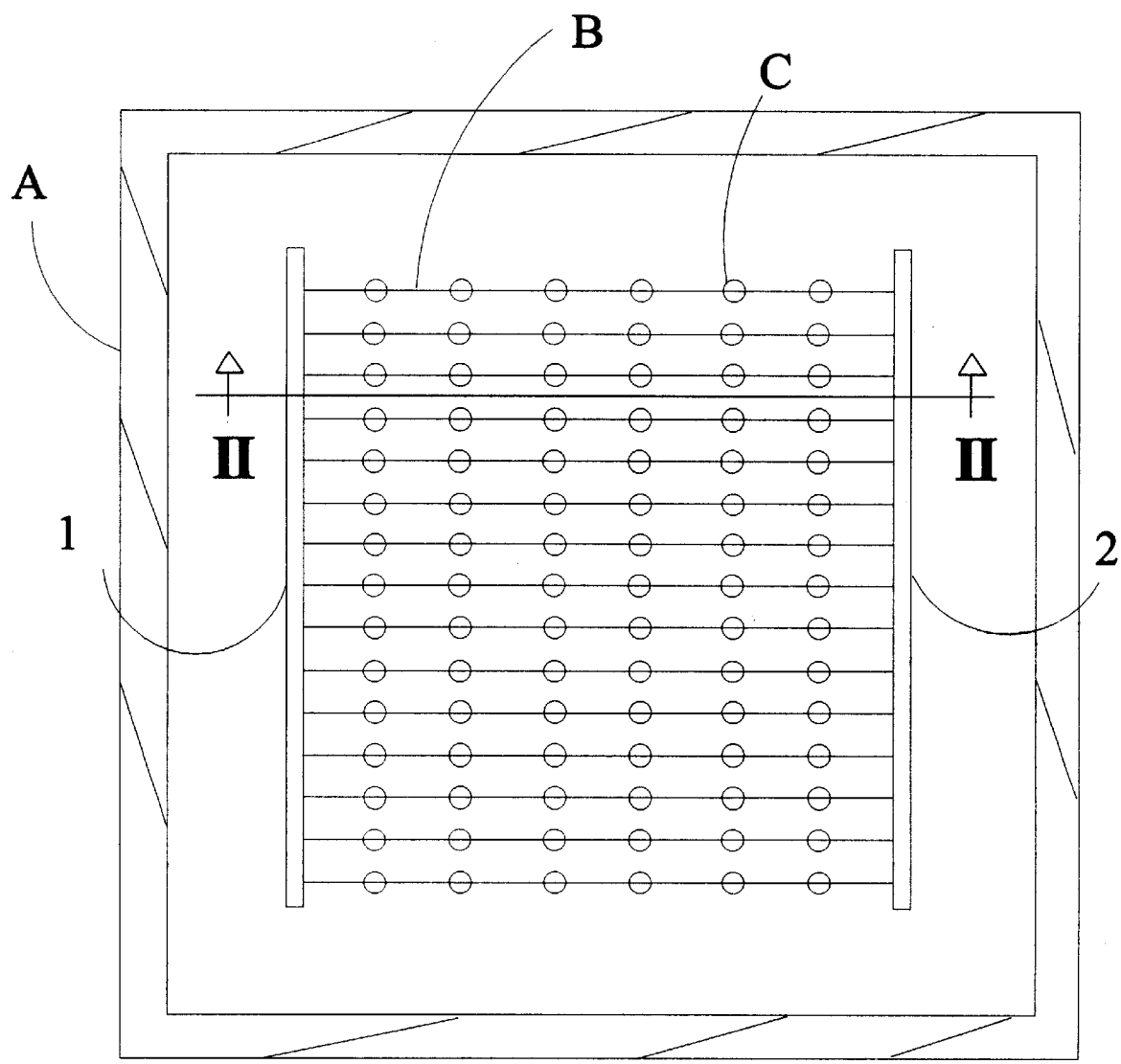
FIG. 1 is a schematic top view of a typical sprinkler installation.

FIG. 1 shows generally a schematic view of a typical sprinkler installation. The view is from the top, looking downward, and is of an installation as might be seen in a warehouse or the like. The walls, shown generally at A, surround the installation. Two mains 1 and 2 run along the length of two opposing walls. The sprinkler pipes, shown generally at B, extend between the mains and form the grid pattern. The sprinkler heads are shown generally at C.

Figure 2:
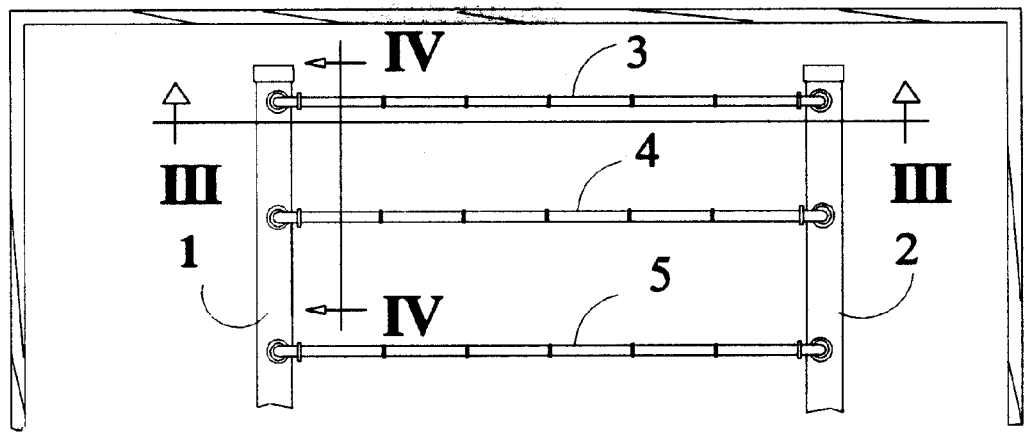
FIG. 2 is a top sectional view taken along line 2—2 of FIG. 1.

Turning now to FIG. 2, which is a top sectional view along line 2—2 of FIG. 1, mains 1 and 2 are shown in more detail. Sprinkler pipes, shown generally at B in FIG. 1, are here identified as 3, 4 and 5 extending between the mains. This figure illustrates a dry installation, that is, one that is not constantly filled with water under pressure. The latter may be known as a wet pressure system. Main 1 is, in this dry installation, the primary water carrier or feed main. When in use, that is when the water floods the system, the water will be fed first into feed main 1, and then through the branch lines or sprinkler pipes B, or in this figure, pipes 3, 4 and 5. The water will travel down through those pipes, and turning for a minute to FIG. 3, may pass through the pennants and sprinkler heads extending downwardly from the sprinkler pipes. Some water may travel through to dummy main 2, where it may be returned to the system or discharged. Some systems lack a second main such as 2, and excess water may stand in the sprinkler pipes or possibly be flushed through the sprinklers after use.

Figure 3:
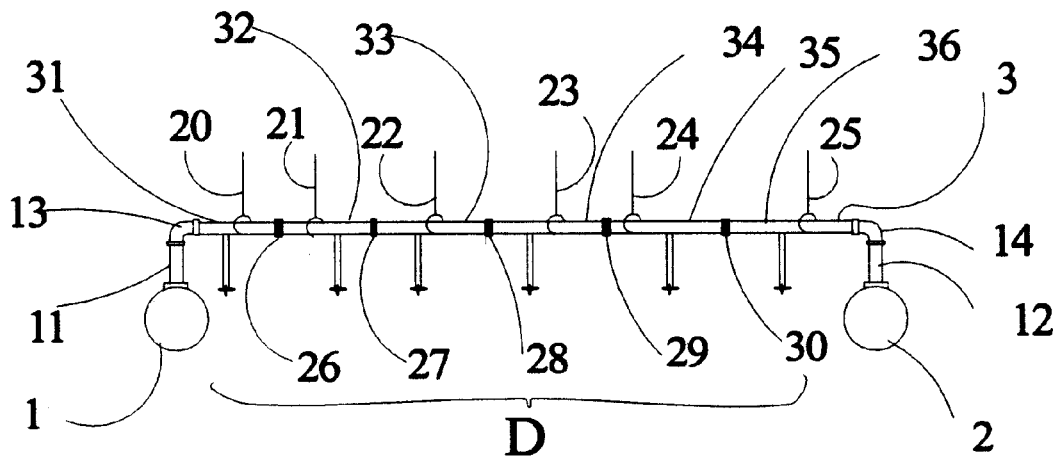
FIG. 3 is a side sectional view taken along line 3—3 of FIG. 2.

As is seen in FIG. 3, which is a side sectional view taken through line 3—3 of FIG. 2, the pennants and sprinkler heads, shown generally at D, depend from pipe 3 extending between the mains. Also seen in FIG. 3 are the hangers 20 through 25 which hold the sprinkler pipe 3 up between the mains and are used, as is explained in more detail below, in the course of installation of the system. The sections of sprinkler pipe 31–36 each have a sprinkler depending therefrom, and each section is tied to the next section by way of couplings 26–30 respectively. Riser nipples 11 and 12 and elbow joints 13 and 14 connect mains 1 and 2 and sprinkler pipe 3. The construction of this sprinkler pipe and connections are the same for each pipe in this system, for example, for all those seen generally at B in FIG. 1.

Figure 4:
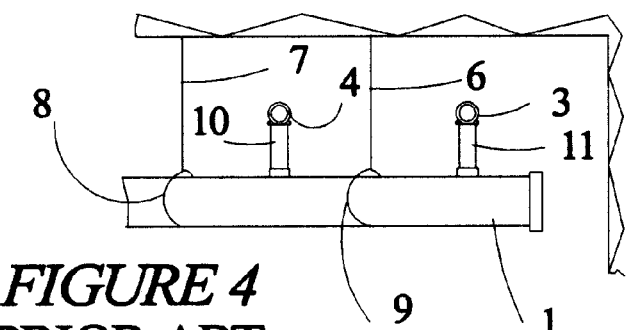
FIG. 4 is another side sectional view taken along line 4—4 of FIG. 2.

FIG. 4 is another side sectional view taken through line 4—4 of FIG. 2. Hangers 6 and 7 hold the main to the ceiling or rafters in much the same manner as the hangers on the sprinkler pipes described above, and via hanger rings 8 and 9 respectively. Shown in cutaway are sprinkler pipes 3 and 4, connected to main 1 by way of riser nipples 10 and 11 and elbow joints (not shown here.) Also not shown in this figure are the sectional couplings of the main pipe.

The branch lines extending off the main, for example 3, 4, and 5 in FIG. 2 are assembled from sections, typically 21 feet in length, and coupled together. Turning back for a moment to FIG. 3, the various couplings are shown at 26–30. Sprinkler head spacing within the branch lines usually varies depending upon the nature of the materials to be held within the building below. More hazardous materials, for example, would have more sprinklers.

Assembling sprinkler systems can be quite challenging because in many instances the entire system is primarily constructed along right angles. The term "right angle" is used here to include a range of angles on either side of ninety degrees, from 88 to 92 degrees. This range includes those angles commonly achieved in the field in installing sprinkler systems, as well as other pipe and other materials systems. When steel or similar material is used for the pipe, it is important for the system to be assembled along a straight line or lines as well. If PVC pipe is used, straight line assembly is less critical, however, it is still desirable to maintain the right angled arrangement. If the right angles are set in a grid or grid like shape, which is also usually the situation, the grid may rack or slant in diamond-like or other shapes. This racking is most likely to be discovered only as the system is being assembled, and therefore the system must then be disassembled if racking is discovered. Accordingly, the present embodiment is useful in preventing racking because, as discussed below in detail, the laser projects a straight line reference beam from which to assist in the construction of the grid.

Figure 5:
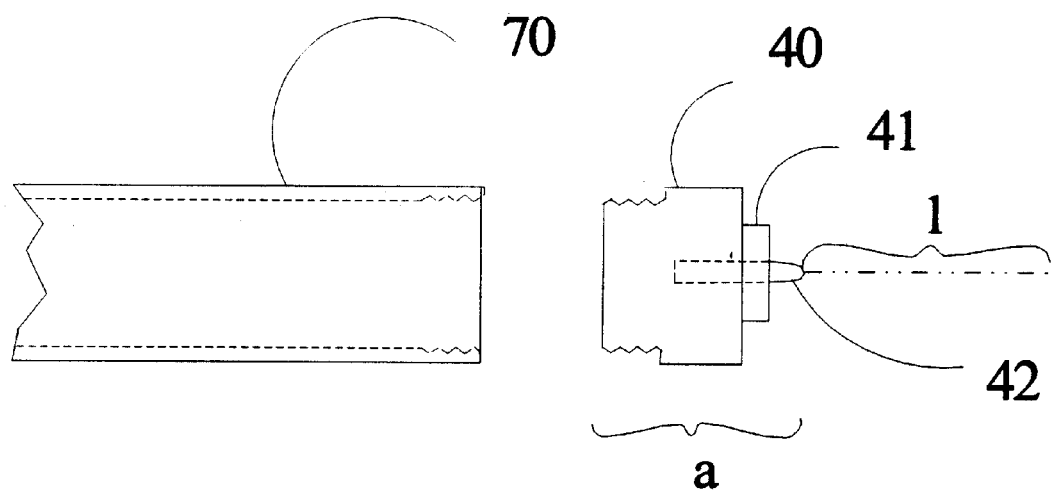
FIG. 5 is a view of a preferred embodiment.

Therefore, turning to FIG. 5, we see an embodiment of an apparatus of the present invention. At 70 is seen a sectional sprinkler pipe, threaded as is often the case. At a is shown generally the embodiment. Cap 40 bears a complementary threading to the pipe 70, and nut area 41 allows for the use of a wrench to tighten or loosen the embodiment on the pipe 70. Laser 42 is removably retained within the nut area 41 and cap 40, although of course in this and other embodiments it may be fixedly retained. The retention area is within the center of the cap so that it retains the laser 42 in order to project the reference beam from the center of the pipe end. The term "center" is used here to include the area within reasonable tolerances about the center of the diameter of the pipe end.

Figure 6:
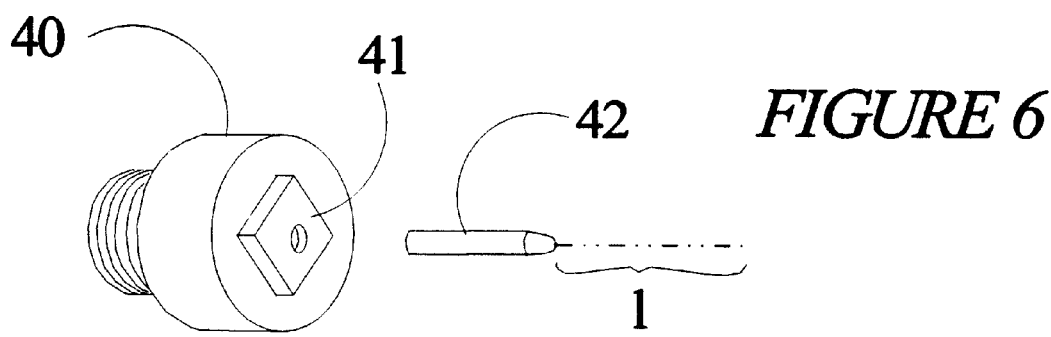
FIG. 6 is another view of the embodiment of FIG. 5.

FIG. 6 illustrates the same embodiment as FIG. 5 in side view, and with the laser 42 exploded outwardly. The laser 42 projects the reference beam of light 1 from the center of the pipe end. Therefore, using this embodiment, when the cap is installed on the pipe a constant reference beam, centered about the pipe end, exists so as to simplify the installation of the sectional piping. Of course, the term "pipe end" is defined here to include the end of pipe as well as fittings used on pipe and known in the art.

Figure 7:
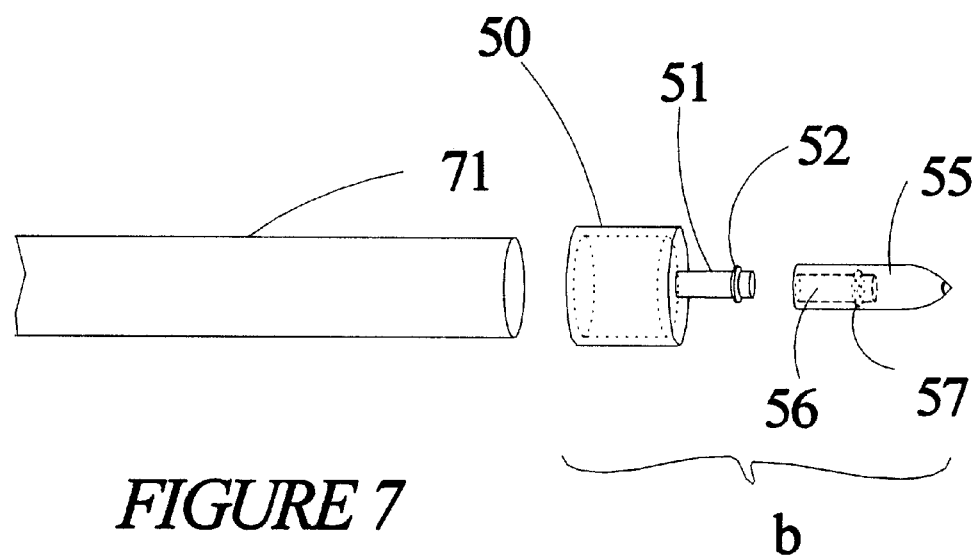
FIG. 7 is a view of another preferred embodiment.

FIG. 7 shows, generally at b, another preferred embodiment. Cap 50 fits over pipe 71. Flange 51 extends outwardly from cap 50. Flange 51 contains ridge 52. Laser 55 contains a recess 56, which mates with flange 51. Ridge 52 "snap fits" into corresponding ridge 57. Embedded in ridge 57 is an on off pressure switch not shown but of a type known in the art which is activated and thus turns laser 55 on when it is snapped onto flange 52.

Figure 8:
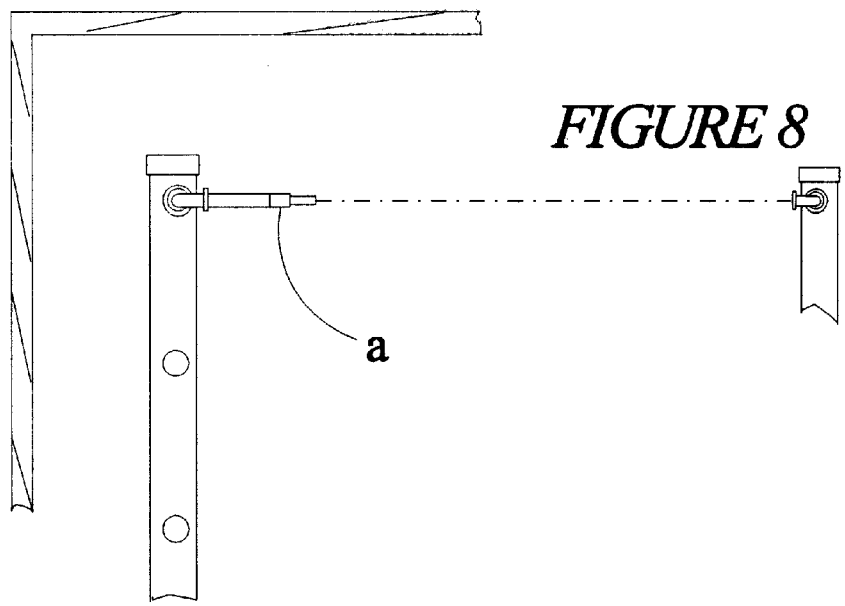
FIG. 8 is a view of an embodiment in use.

In FIG. 8, the embodiment a is seen mounted on a sprinkler pipe section. It projects a centered reference beam from which to align other mains, dummy or otherwise, and/or subsequent pipe sections. For example, as shown in FIG. 2, the sprinkler pipe runs between the two mains. Feed main 1 is put up first. Dummy main 2 must then be aligned, either before or as the sprinkler pipe is placed, with main 1. If the riser nipples of each do not line up, the sprinkler pipe will not run in the desired grid line fashion, and racking or other misalignment will occur. Using the embodiment of FIG. 8, the projected beam provides an alignment point for the pipe installation. The beam 1 seen in FIG. 8 will enable proper alignment of the riser nipples and elbow joint on the main 2, and so assist in the assembly of the system along the desired right angle shape.

Figure 9:
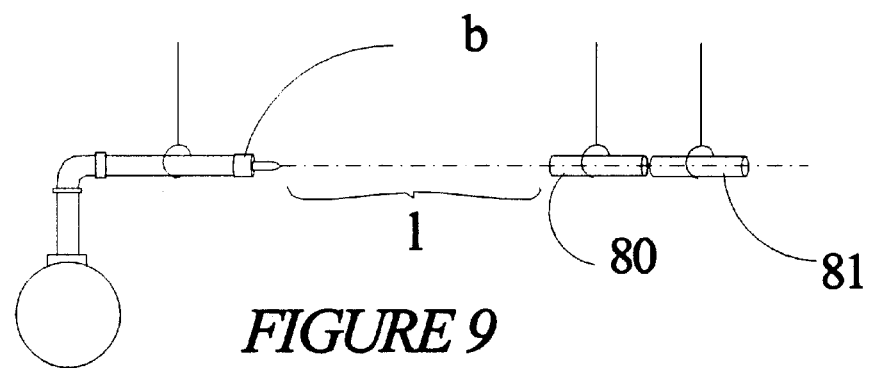
FIG. 9 is a view of an embodiment in use.

FIG. 9 illustrates the beam 1 projecting outwardly from the mounted embodiment b and the sections 80 and 81 being assembled by use of the reference beam 1. The hangers usually have a knurled adjustment mechanism, (not shown here) and so can be used to change the elevation of the sections after the desired alignment is obtained. Thus, in addition to two dimensional alignment, embodiments of the present invention can be utilized to assist in three dimensional alignment, that is, assuring consistent elevation of the entire system.

Three dimensional alignment can also be necessary when aligning the mains as well as sectional pipe. Currently, measurements are usually made from the floor of the warehouse, thus making vertical alignment dependent upon the slope of the floor. However, the straight line reference point (perhaps when combined with an initial leveling of the pipe) provided by various embodiments of the present invention will assist in ensuring proper vertical alignment without the need for constant measurement and remeasurement. For example, other embodiments use a spirit or other level known in the art in combination with laser alignment apparatus and methods to ensure reference beam alignment in three dimensions.

Figure 10:
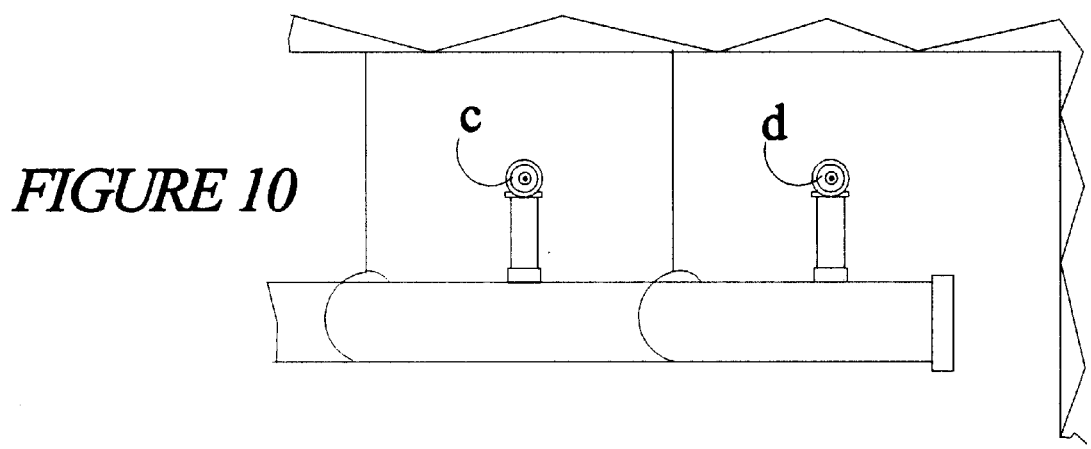
FIG. 10 is a view of an embodiment in use.

FIG. 10 shows multiple embodiments c and d in use to assemble sectional sprinkler pipe in a view similar to that as seen in FIG. 4. Here the embodiment provides multiple straight line reference points to assist in installation.

The embodiment of FIG. 6 as well as the embodiment of FIG. 7 as well as other embodiments may use one laser and multiple mounting apparatus. For example, the threaded portion 40 of FIG. 6 or the cap 50 of FIG. 7 could be of various sizes in order to fit pipes of various diameters. In use, the appropriate diameter is fit onto the reference pipe and a laser would then be inserted into the recess of the embodiment of FIG. 6 or snap fit onto the flange of the cap 50. In the latter embodiment, this would turn the laser on by way of the pressure sensitive on off switch and thereby establish a reference line or lines. Other embodiments may of course use the same or similar apparatus and methods of turning the laser on, including contact switches triggered by contact with the pipe or other materials in order to turn the laser on and establish the reference beam. For example if a threaded section is used, a pressure plunger switch such as is known in the art could be used to turn the laser on when the threaded section contacts the pipe initially or at a predetermined depth or depths.

The present invention uses semiconductor laser technology of types known in the art. Semiconductor lasers are generally smaller than gas lasers and generally require a lower level of power. Semiconductors do not generally produce as powerful a beam of light, yet their small size and ability to be powered by a common household batteries gives them the ability to be used in many situations, such as internal construction or other alignment operations.

The preferred embodiments are used to correspond with pipe sizes known in the art, both standardized and customized. Often sprinkler pipes have diameters from ½ to 2 inches, but of course various embodiments may be used with both sprinkler and other pipes of greater and lesser dimensions.

Of course, other methods of use may exist for various embodiments of the present invention. When installing a pipe in a new installation with numerous walls, such as fire walls in sequence such as is encountered in an office setting or strip mall setting, the installation of the pipe in such construction calls for a sequence of holes to be drilled or bored in the successive walls. The drilling or boring point of each hole usually must be measured from the ground with appropriate correction for out of square conditions. Otherwise the pipe run will not be straight, or could not be installed at all. Installation of an embodiment of the present invention such as is shown in FIG. 6 can be utilized to ensure accurate installation and eliminate the need for the hand measurement process by using the projected beam on the reference wall sites and thereby providing an alignment point for the pipe installation. By using embodiments of the present invention to establish the successive drilling or boring point of each hole, a constant, straight reference point can be established for the path of the pipe run, thus eliminating the possibly inconsistent results heretofore achieved with hand measurement.

Indeed, any installation of pipe or other materials sharing the similar characteristics of right angle or straight installation needs, such as long runs of scaffolding, rafters, or other beams could benefit from various embodiments of the present inventions. The term "straight" as used here includes normal variations as are found in construction operations. Nor is use limited to these situations. For example, embodiments may be used in determining the holes in drop ceilings for sprinkler heads and other installations. By using a reference beam cast from a embodiment installed on a pennant, the proper reference can be established for the sprinkler holes in the ceilings.

Accordingly, the above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

I claim:

1. A laser alignment device comprising:

semiconductor laser means and mounting means whereby said mounting means operates to attach said laser means to a pipe end; and, pressure sensitive switch means whereby said semiconductor laser means is turned on through contact with said pipe end.

2. A laser alignment device comprising:

mounting means comprising:
   pipe attachment means adapted for installation on a pipe end; and
   laser attachment means, comprising a flange means extending outwardly from said mounting means and generally centered on said mounting means; and, semiconductor laser means with on off switch means and adapted to be mounted on said laser attachment means;

wherein said pipe attachment means attaches said laser means about the center of the pipe end and wherein said flange means further comprises a means for activation of said on off switch on said semiconductor laser means.

\* \* \* \* \*